United States Patent
Du et al.

(10) Patent No.: US 7,473,791 B2
(45) Date of Patent: Jan. 6, 2009

(54) METHOD FOR SYNTHESIZING BIODIESEL FROM RENEWABLE OILS

(75) Inventors: Wei Du, Qinghuayuan (CN); Yuanyuan Xu, Qinghuayuan (CN); Dehua Liu, Qinghuayuan (CN)

(73) Assignee: Tsinghua University, Beijing (CN)

( * ) Notice: Subject to any disclaimer, the term of this patent is extended or adjusted under 35 U.S.C. 154(b) by 221 days.

(21) Appl. No.: 10/549,336

(22) PCT Filed: Jan. 15, 2004

(86) PCT No.: PCT/CN2004/000051

§ 371 (c)(1),
(2), (4) Date: Jun. 20, 2006

(87) PCT Pub. No.: WO2004/081158

PCT Pub. Date: Sep. 23, 2004

(65) Prior Publication Data

US 2006/0257986 A1    Nov. 16, 2006

(30) Foreign Application Priority Data

Mar. 13, 2003    (CN) ............................... 03 1 19600

(51) Int. Cl.
C07C 1/00    (2006.01)
(52) U.S. Cl. ...................... 554/169; 554/168
(58) Field of Classification Search ................ 554/169, 554/174
See application file for complete search history.

(56) References Cited

FOREIGN PATENT DOCUMENTS

| JP | 2002-233393 | 8/2002 |
|---|---|---|
| WO | WO 01/38553 A1 | 11/2000 |

OTHER PUBLICATIONS

Mukherjee, K.D. et al., Enrichment of very-long-chain mono-unsaturated fatty acids by lipase-catalysed hydrolysis and transesterification, 1996, Applied Microbiology and Biotechnolygy, vol. 44, No. 5, pp. 557, 558, 560, 561.*
Wagner, R. et al. Synthetic Organic Chemistry, Alcoholysis of Esters, 1965, John Wiley & sons, Inc., 5th printing, pp. 486-487.*
Shimada, Y. et al., Conversion of Vegetable Oil to biodiesel using Immobilized Candida antarctica Lipase, 1999, The Journal of the American Oil Chemists' Society, vol. 76, No. 7. pp. 789, 790, 792.*

* cited by examiner

*Primary Examiner*—Daniel M Sullivan
*Assistant Examiner*—Yate'K Cutliff
(74) *Attorney, Agent, or Firm*—McKee, Voorhees & Sease, P.L.C.

(57) ABSTRACT

This invention provides a process for synthesizing biodiesel from renewable oils, comprising: carrying out a transesterification reaction, in the presence of an enzyme catalyst, between a low carbon fatty acid ester RCOOR' as an acyl acceptor and a renewable oil, wherein the molar ratio of the low carbon fatty acid ester to the renewable oil is in the range of from 3:1 to 20:1, the transesterification reaction producing a glycerine tri-(low carbon) carboxylic ester by-product, and reacting the glycerine tri-(low carbon) carboxylic ester by-product with a low carbon alcohol R'OH to obtain the low carbon fatty acid ester, wherein the low carbon fatty acid ester is capable of being recycled in a further round of biodiesel synthesis, wherein R and R' are independently selected from the group consisting of alkyls with one to four carbon atoms.

9 Claims, 1 Drawing Sheet

METHOD FOR SYNTHESIZING BIODIESEL FROM RENEWABLE OILS

FIELD OF THE INVENTION

The present invention relates to the field of bio-fuel synthesis. More specifically, the present invention relates to a method for synthesizing biodiesel by utilizing renewable oils.

BACKGROUND OF THE INVENTION

Long chain fatty acid esters derived from renewable oils via transesterification are known as biodiesel, which is a new kind of pollutionless, recoverable energy source. Biodiesel has combustion properties very similar to those of a petroleum system. Since it significantly reduces toxic emissions by 50% when burned as a fuel, great interest has been raised for the study and application of biodiesel. (Hideki Fukuda et al., Biodiesel fuel production by transesterification of oils, J. Biosci. Bioeng., 2001, 92(5):405-416).

Currently, biodiesel is manufactured mainly through chemical methods. More particularly, vegetable oils and/or animal fats are used as a source of long chain fatty acids and a transesterification reaction between the long chain fatty acids and some low carbon alcohols, such as methanol or ethanol, is carried out in the presence of an acid or base catalyst, and methyl ester or ethyl ester of the fatty acids are obtained. However, some inevitable disadvantages exist in chemical methods as follows: free fatty acids and water in the renewable oils raw material severely spoil the reaction; emulsion is undesirably formed due to the poor solubility of alcohol in renewable oils, and the following processes are complicated accordingly; the need for significantly excess alcohol results in greater energy consumption in later distillation and reflux processes of the alcohol.

In contrast, synthesizing biodiesel through bio-methods has the following advantages: mild reaction conditions, non-toxic emissions, and enzyme-catalyzed reactions are not affected by free fatty acid and small amounts of water in the renewable oils used as raw materials. Therefore, bio-methods are consistent with the requirement of developing Green Chemistry, and thus have attracted more and more attention. (Yomi Watanabe et al., Continuous production of biodiesel fuel from vegetable oil using immobilized *Candida antarctica* lipase, JAOCS, 2000, 7(4): 355-358). In previously reported processes of preparing biodiesel through biological enzyme-catalyzed methods, low carbon alcohols such as methanol and ethanol are mainly used as acyl acceptors in the reactions. However, problems exist in these processes where low carbon alcohols are used as acyl acceptors. For example, low carbon alcohols are harmful to enzyme molecules and shorten the functional life of enzyme. Moreover glycerine is generated as a by-product, which tends to block the active site of the immobilized enzyme and thus is harmful to enzyme activity. (Yuji Shimada et al. Enzymatic alcoholysis for biodiesel fuel production and application of the reaction to oil processing, Journal of Molecular Catalysis B: Enzymatic, 2002, 17: 133-142).

SUMMARY OF THE INVENTION

The object of the present invention is to provide a method for synthesizing biodiesel from renewable oils. In this method, a low carbon fatty acid ester RCOOR' is used as an acyl acceptor, wherein R and R' are independently selected from the group consisting of alkyls with one to four carbon atoms, and renewable oils are converted into biodiesel. Also, in the method of the present invention, glycerine tri-(low carbon) carboxylic acid ester is produced as a by-product, which can be separated and further reacted with a low carbon alcohol R'OH to form the low carbon fatty acid ester that is recycled in the process of synthesizing biodiesel.

In the present invention, an enzyme is used to catalyse the transesterification of the renewable oils to produce biodiesel, while a low carbon fatty acid ester is acting as an acyl acceptor. The low carbon fatty acid ester dissolves well in oils (low carbon alcohol has poor solubility in oils), and does not adversely affect the activity of the enzyme. The molar ratio of the low carbon fatty acid ester to the renewable oils is 3:1-20:1. After 4-20 hours of reaction, biodiesel is produced. In the process, instead of glycerine, glycerine tri-(low carbon) carboxylic acid ester is generated as a by-product, which has no negative effect on the activity of the enzyme. After separation, the by-product glycerine tri-(low carbon) carboxylic acid ester can further react with a low carbon alcohol and obtain the low carbon fatty acid ester again. Since glycerine tri-(low carbon) carboxylic acid ester is compatible with low carbon alcohols, their reaction can be smoothly carried out even under conventional conditions, and the low carbon fatty acid esters produced can be recycled to be used in the synthesis of biodiesel.

BEST MODE OF THE INVENTION

Figure 1:
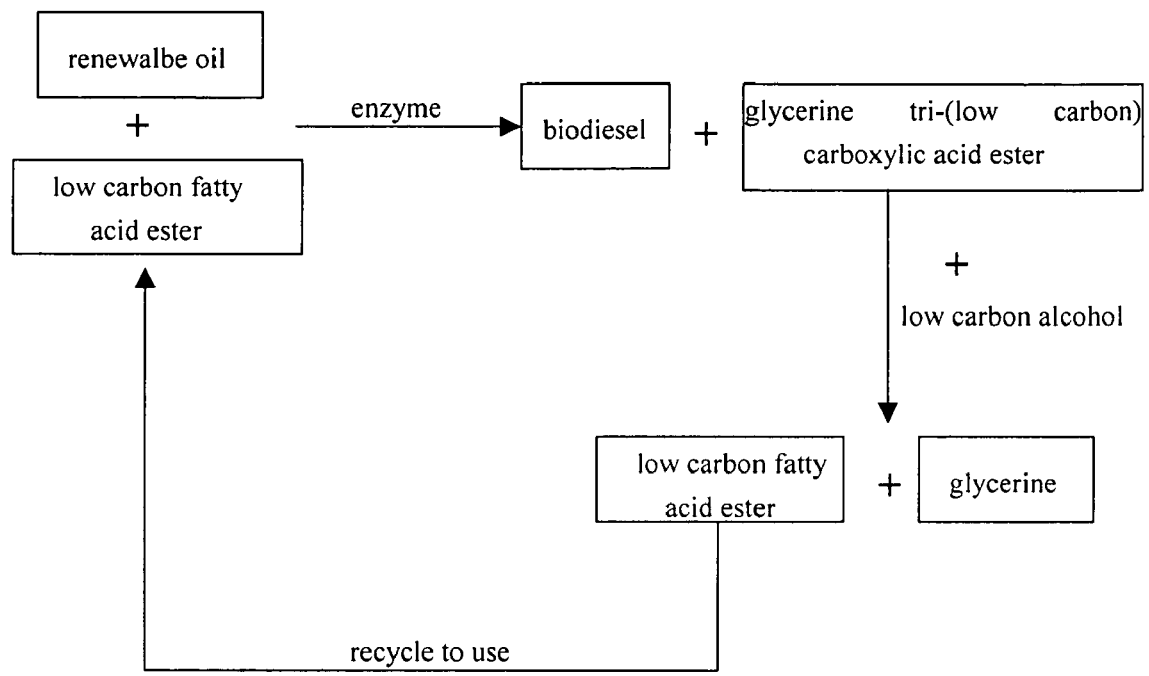
FIG. 1 is a process flow chart showing the process of synthesizing biodiesel from renewable oils according to the present invention, wherein low carbon fatty acid esters are used as acyl acceptors.

In the present invention, a low carbon fatty acid ester is selected from the group consisting of methyl acetate, ethyl acetate, methyl formate, ethyl formate, methyl propionate and combinations thereof.

The enzyme used in the process is a lipase obtained from *Candida antarctica* or *Rhizomucor miehei*. Preferably, the enzyme is Novozym® 435, Lipozyme® RM or the combination thereof.

The renewable oils comprise castor oil, rapeseed oil, soybean oil, peanut oil, corn oil, cotton seed oil, waste grease and other vegetable oil, fish oil, lard and other animal renewable oils, and alga oil and fat, etc.

The molar ratio of the low carbon fatty acid ester to the renewable oils is 3:1-20:1, preferably 4:1-14:1.

The reaction between the low carbon fatty acid ester and the renewable oils can be carried out in an automatically thermostatic oscillating shaker, and the reaction temperature is 20° C. to 60° C., preferably 30° C. to 50° C.

The amount of the enzyme according to the present invention is 5-30% based on the weight of the renewable oils, and the reaction time is 4-20 hours. After the reaction, biodiesel is produced with glycerine tri-(low carbon) carboxylic ester as a by-product.

As shown in FIG. 1, instead of low carbon alcohol, a low carbon fatty acid ester, which is non-toxic to the enzyme is used as an acyl acceptor for synthesizing the biodiesel. The reaction conditions are mild and the process can be easily controlled. Furthermore, instead of glycerine, glycerine tri-(low carbon) carboxylic acid ester is generated as a by-product, which would not clog the pore of the immobilized enzyme and have no negative effects on the activity of the immobilized enzyme. After the reaction, the enzyme is subjected to filtration so as to be directly reused in the transesterification reaction and it still can keep a high catalytic activity. After separation, the by-product glycerine tri-(low carbon) carboxylic acid ester can further react with a low carbon alcohol to form the above said low carbon fatty acid ester again, and this reaction can be easily carried out under conventional conditions. Meanwhile the generated low carbon fatty acid ester can be recycled to the biodiesel synthesizing process. In the whole process, the raw materials are the renewable oils and the inexpensive low carbon alcohol. Therefore, the negative effects of the low carbon alcohol and the by-product glycerine on the activity of enzyme are effectively avoided, and the operating life of the enzyme is tremendously prolonged.

EXAMPLES

The following examples are included to illustrate the present invention, and are not intended to limit in any way the scope of the invention.

Example 1

An Erlenmeyer flask was charged with methyl acetate and soybean oil (9.7 g), wherein the molar ratio of the methyl acetate to the soybean oil was 3:1, and the contents were mixed uniformly. Then the flask was plugged and put into an automatically thermostatic oscillating shaker and heated to 30° C. Afterwards, 30% immobilized lipase Novozym® 435 based on the weight of the soybean oil was added into the flask. After 4 hours reaction, 8.5 g biodiesel was produced, and the yield was 88%.

Example 2

An Erlenmeyer flask was charged with methyl acetate and soybean oil (9.7 g), wherein the molar ratio of the methyl acetate to the soybean oil was 12:1, and the contents were mixed uniformly. Then the flask was plugged and put into an automatically thermostatic oscillating shaker and heated to 40° C. Afterwards, 30% immobilized lipase Novozym® 435 based on the weight of the soybean oil was added into the flask. After 6 hours reaction, 9.2 g biodiesel was produced, and the yield was 95%.

Example 3

An Erlenmeyer flask was charged with methyl acetate and soybean oil (9.7 g), wherein the molar ratio of the methyl acetate to the soybean oil was 20:1, and the contents were mixed uniformly. Then the flask was plugged and put into an automatically thermostatic oscillating shaker and heated to 30° C. Afterwards, 30% immobilized lipase Novozym® 435 based on the weight of the soybean oil was added into the flask. After 8 hours reaction, 8.7 g biodiesel was produced, and the yield was 90%.

Example 4

An Erlenmeyer flask was charged with methyl acetate and soybean oil (9.7 g), wherein the molar ratio of the methyl acetate to the soybean oil was 12:1, and the contents were mixed uniformly. Then the flask was plugged and put into an automatically thermostatic oscillating shaker and heated to 30° C. Afterwards, 30% immobilized lipase Novozym® 435 based on the weight of the soybean oil was added into the flask. After 10 hours reaction, 9.2 g biodiesel was produced, and the yield was 95%.

Example 5

An Erlenmeyer flask was charged with methyl acetate and soybean oil (9.7 g), wherein the molar ratio of the methyl acetate to the soybean oil was 12:1, and the contents were mixed uniformly. Then the flask was plugged and put into an automatically thermostatic oscillating shaker and heated to 60° C. Afterwards, 30% immobilized lipase Novozym® 435 based on the weight of the soybean oil was added into the flask. After 6 hours reaction, 8.7 g biodiesel was produced, and the yield was 90%.

Example 6

An Erlenmeyer flask was charged with methyl acetate and soybean oil (9.7 g), wherein the molar ratio of the methyl acetate to the soybean oil was 12:1, and the contents were mixed uniformly. Then the flask was plugged and put into an automatically thermostatic oscillating shaker and heated to 40° C. Afterwards, 5% immobilized lipase Novozym® 435 based on the weight of the soybean oil was added into the flask. After 15 hours reaction, 9.2 g biodiesel was produced, and the yield was 95%.

Example 7

An Erlenmeyer flask was charged with ethyl acetate and soybean oil (9.7 g), wherein the molar ratio of the ethyl acetate to the soybean oil was 12:1, and the contents were mixed uniformly. Then the flask was plugged and put into an automatically thermostatic oscillating shaker and heated to 40° C. Afterwards, 30% immobilized lipase Novozym® 435 based on the weight of the soybean oil was added into the flask. After 8 hours reaction, 9.2 g biodiesel was produced, and the yield was 95%.

Example 8

An Erlenmeyer flask was charged with methyl formate and soybean oil (9.7 g), wherein the molar ratio of the methyl formate to the soybean oil was 12:1, and the contents were mixed uniformly. Then the flask was plugged and put into an automatically thermostatic oscillating shaker and heated to 40° C. Afterwards, 30% immobilized lipase Novozym® 435 based on the weight of the soybean oil was added into the flask. After 9 hours reaction, 9.1 g biodiesel was produced, and the yield was 94%.

Example 9

An Erlenmeyer flask was charged with ethyl propionate and soybean oil (9.7 g), wherein the molar ratio of the ethyl propionate to the soybean oil was 12:1, and the contents were mixed uniformly. Then the flask was plugged and put into an automatically thermostatic oscillating shaker and heated to 40° C. Afterwards, 30% immobilized lipase Novozym® 435 based on the weight of the soybean oil was added into the flask. After 12 hours reaction, 8.7 g biodiesel was produced, and the yield was 90%.

Example 10

An Erlenmeyer flask was charged with methyl acetate and cotton seed oil (9.7 g), wherein the molar ratio of the methyl acetate to the cotton seed oil was 12:1, and the contents were mixed uniformly. Then the flask was plugged and put into an automatically thermostatic oscillating shaker and heated to 40° C. Afterwards, 30% immobilized lipase Novozym® 435 based on the weight of the cotton seed oil was added into the flask. After 7 hours reaction, 8.9 g biodiesel was produced, and the yield was 92%.

Example 11

An Erlenmeyer flask was charged with methyl acetate and rapeseed oil (9.7 g), wherein the molar ratio of the methyl acetate to the rapeseed oil was 12:1, and the contents were mixed uniformly. Then the flask was plugged and put into an automatically thermostatic oscillating shaker and heated to 40° C. Afterwards, 30% immobilized lipase Novozym® 435 based on the weight of the rapeseed oil was added into the flask. After 7 hours reaction, 9.3 g biodiesel was produced, and the yield was 96%.

Example 12

An Erlenmeyer flask was charged with methyl acetate and alga oil and fat (9.7 g), wherein the molar ratio of the methyl acetate to the alga oil and fat was 12:1, and the contents were mixed uniformly. Then the flask was plugged and put into an automatically thermostatic oscillating shaker and heated to 40° C. Afterwards, 30% immobilized lipase Novozym® 435 based on the weight of the alga oil and fat was added into the flask. After 10 hours reaction, 8.9 g biodiesel was produced, and the yield was 92%.

Example 13

An Erlenmeyer flask was charged with methyl acetate and the waste grease (9.7 g), wherein the molar ratio of the methyl acetate to the waste grease was 12:1, and the contents were mixed uniformly. Then the flask was plugged and put into an automatically thermostatic oscillating shaker and heated to 40° C. Afterwards, 30% immobilized lipase Novozym® 435 based on the weight of the waste grease was added into the flask. After 12 hours reaction, 8.5 g biodiesel was produced, and the yield was 88%.

Example 14

An Erlenmeyer flask was charged with methyl acetate and lard (9.7 g), wherein the molar ratio of the methyl acetate to the lard was 12:1, and the contents were mixed uniformly. Then the flask was plugged and put into an automatically thermostatic oscillating shaker and heated to 50° C. Afterwards, 30% immobilized lipase Novozym® 435 based on the weight of the lard was added into the flask. After 10 hours reaction, 8.7 g biodiesel was produced, and the yield was 90%.

Example 15

An Erlenmeyer flask was charged with methyl acetate and soybean oil (9.7 g), wherein the molar ratio of the methyl acetate to the soybean oil was 12:1, and the contents were mixed uniformly. Then the flask was plugged and put into an automatically thermostatic oscillating shaker and heated to 40° C. Afterwards, 30% immobilized lipase Lipozyme® RM based on the weight of the soybean oil was added into the flask. After 12 hours reaction, 8.2 g biodiesel was produced, and the yield was 85%.

Example 16

An Erlenmeyer flask was charged with ethyl acetate and cotton seed oil (9.7 g), wherein the molar ratio of the ethyl acetate to the cotton seed oil was 12:1, and the contents were mixed uniformly. Then the flask was plugged and put into an automatically thermostatic oscillating shaker and heated to 40° C. Afterwards, 30% immobilized lipase Lipozyme® RM based on the weight of the cotton seed oil was added into the flask. After 14 hours reaction, 8.1 g biodiesel was produced, and the yield was 84%.

Example 17

An Erlenmeyer flask was charged with methyl formate and the waste grease (9.7 g), wherein the molar ratio of the methyl formate to the waste grease was 12:1, and the contents were mixed uniformly. Then the flask was plugged and put into an automatically thermostatic oscillating shaker and heated to 40° C. Afterwards, 5% immobilized lipase Lipozyme® RM based on the weight of the waste grease was added into the flask. After 20 hours reaction, 7.7 g biodiesel was produced, and the yield was 80%.

Example 18

An Erlenmeyer flask was charged with methyl propionate and lard (9.7 g), wherein the molar ratio of the methyl propionate to the lard was 10:1, and the contents were mixed uniformly. Then the flask was plugged and put into an automatically thermostatic oscillating shaker and heated to 50° C. Afterwards, 30% immobilized lipase Novozym® 435 based on the weight of the lard was added into the flask. After 15 hours reaction, 8.7 g biodiesel was produced, and the yield was 89%.

Example 19

An Erlenmeyer flask was charged with butyl acetate and soybean oil (9.7 g), wherein the molar ratio of the butyl acetate to the soybean oil was 14:1, and the contents were mixed uniformly. Then the flask was plugged and put into an automatically thermostatic oscillating shaker and heated to 30° C. Afterwards, 20% immobilized lipase Novozym® 435 based on the weight of the soybean oil was added into the flask. After 12 hours reaction, 9.0 g biodiesel was produced, and the yield was 91%.

Example 20

An Erlenmeyer flask was charged with butyl propionate and soybean oil (9.7 g), wherein the molar ratio of the butyl propionate to the soybean oil was 10:1, and the contents were mixed uniformly. Then the flask was plugged and put into an automatically thermostatic oscillating shaker and heated to 50° C. Afterwards, 5% immobilized lipase Novozym® 435 and 15% lipase Lipozyme® RM based on the weight of the soybean oil was added into the flask. After 15 hours reaction, 8.9 g biodiesel was produced, and the yield was 92%.

Example 21

The lipase used in Example 2 was filtered after the reaction and was used in the next round of reaction, which was carried out under the same conditions as that in Example 2. The lipase was reused for ten times as such. In the 10th round of reaction, 9.2 g biodiesel was obtained after 6 hours reaction, and the yield was still as high as 95%. Therefore, the lipase had good operative stability in the process of the present invention.

Example 22

An Erlenmeyer flask was charged with 3:2 in molar ratio methanol and the by-product glycerine tri-acetate ester obtained in Example 2, and the contents were mixed uniformly. Then the flask was plugged and put into an automatically thermostatic oscillating shaker and heated to 40° C. Afterwards, 0.6% NaOH based on the weight of the glycerine tri-acetate ester was added into the flask. After 4 hours reaction, 99% methanol was converted into methyl acetate, which can be directly recycled to the biodiesel synthesizing process after a simple distillation.

From the above examples we can see that, with low carbon fatty acid esters being used as acyl acceptors and under the proper temperature range, biodiesel can be effectively produced from different kinds of renewable oils (castor oil, rapeseed oil, cotton seed oil, waste grease, soybean oil, fish oil, lard, alga oil and fat, and etc.) in the presence of 5%-30% immobilized enzyme (based on the weight of the renewable oils) (Novozym® 435 or Lipozyme® RM, obtained from *Candida antarctica* or *Rhizomucor miehei*). The by-product glycerine tri-(low carbon) carboxylic acid ester can further react with a low carbon alcohol R'OH to form the low carbon fatty acid ester again, which can be recycled into the synthesis process of the biodiesel.

We claim:

1. A process for synthesizing biodiesel from renewable oils, comprising:
    carrying out a transesterification reaction, between a low carbon fatty acid ester RCOOR' as an acyl acceptor and a renewable oil, in the presence of an enzyme catalyst, wherein the molar ratio of the low carbon fatty acid ester to the renewable oil is in the range of from 3:1 to 20:1, the transesterification reaction producing a glycerine tri-(low carbon) carboxylic ester by-product; and
    reacting the glycerine tri-(low carbon) carboxylic ester by-product with a low carbon alcohol R'OH to obtain the low carbon fatty acid ester, wherein the low carbon fatty acid ester is capable of being recycled in a further round of biodiesel synthesis;
    wherein R and R' are independently selected from the group consisting of alkyls with one to four carbon atoms.

2. A process according to claim 1, wherein the transesterification reaction is carried out at a temperature of 20° C. to 60° C.

3. A process according to claim 2, wherein the transesterification reaction is carried out at a temperature of 30° C. to 50° C.

4. A process according to claim 1, wherein the transesterification reaction is carried out for 4 to 20 hours.

5. A process according to claim 1, wherein the amount of the enzyme is 5 to 30% based on the weight of the renewable oil.

6. A process according to claim 1, wherein the molar ratio of the low carbon fatty acid ester to the renewable oil is 4:1-14:1.

7. A process according to claim 1, wherein the low carbon fatty acid ester is selected from the group consisting of methyl acetate, ethyl acetate, methyl formate, ethyl formate, methyl propionate, ethyl propionate, methyl butyrate, butyl formate and combinations thereof.

8. A process according to claim 1, wherein the enzyme is one or more lipase obtained from *Candida antarctica* and *Rhizomucor miehei*.

9. A process according to claim 1, wherein the renewable oil is selected from the group consisting of castor oil, rapeseed oil, soybean oil, fish oil, lard, waste grease, alga renewable oils and combinations thereof.

* * * * *